Figure 1:
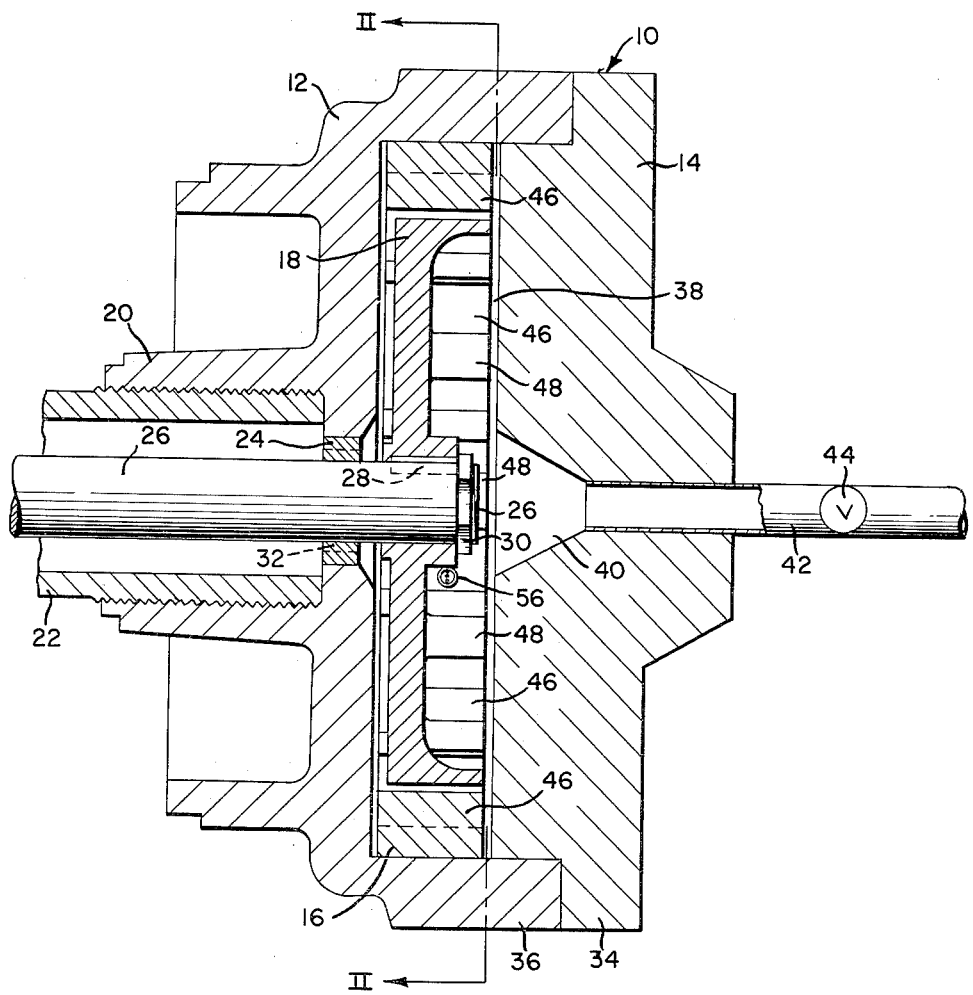

Jan. 23, 1962 R. B. DUGGINS 3,018,091
PRECIPITATION APPARATUS
Filed April 10, 1959 2 Sheets-Sheet 1

Jan. 23, 1962  R. B. DUGGINS  3,018,091
PRECIPITATION APPARATUS
Filed April 10, 1959  2 Sheets-Sheet 2

3,018,091
PRECIPITATION APPARATUS
Ray B. Duggins, Wilmington, Del., assignor to E. I. du Pont de Nemours and Company, Wilmington, Del., a corporation of Delaware
Filed Apr. 10, 1959, Ser. No. 805,440
5 Claims. (Cl. 259—9)

This invention relates generally to the production of paper-making particles from a synthetic polymer and, more particularly, to an improved apparatus for imparting shear forces to particles precipitating from a polymer solution.

The term "fibrid," as used hereinafter, designates a non-rigid synthetic polymeric particle having a high surface area per volume and an exceptional ability to form paper-like structures when deposited on a conventional paper-maker's screen. To warrant designation as a "fibrid," a particle must possess (a) an ability to form a waterleaf having a couched wet tenacity of at least about 0.002 gram per denier when a plurality of the said particles is deposited from a liquid suspension upon a screen, which waterleaf, when dried at a temperature below about 50° C., has a dry tenacity at least equal to its couched wet tenacity and (b) an ability, when a plurality of the said particles is deposited concomitantly with staple fibers from a liquid suspension upon a screen, to bond a substantial weight of the said fibers by physical entwinement of the said particles with the said fibers to give a composite waterleaf with a wet tenacity of at least about 0.002 gram per denier. Such fibrid particles have been produced experimentally by dispersing a polymer solution in a suitable precipitant and agitating the precipitant to deform the coagulating particles. When these coagulating particles are no longer deformable, i.e., when they have set up as fibrids, they are frequently frazzled and have a high absorptive capacity for water. A typical fibrid particle is described more fully in copending application Ser. No. 635,876, filed January 23, 1957, and now abandoned, as well as in copending application Serial No. 788,371, filed January 22, 1959, which is a continuation-in-part thereof.

The most important object of the present invention is the provision of an apparatus for producing fibrids continuously and on a commercial scale.

Another important object of the present invention is to provide an apparatus for imparting shear forces to particles precipitated from a polymer solution.

A further important object of the present invention is the provision of an apparatus in which the coagulating particles are retained in zones of high shear at least until they have set up as fibrids.

It is also an object of this invention to incorporate sufficient variables into the apparatus and the equipment associated therewith to permit its use in producing fibrids from any of several synthetic polymers.

With these and other objects in view, the apparatus of the present invention comprises generally a precipitation vessel having therein a cylindrical chamber, a rotor having radially spaced blades thereon, stator means in the chamber and including a plurality of spaced elements arranged at the periphery of the rotor, inlet means for both a precipitant and a polymer solution, and outlet means for discharging slurry from the chamber. Other, more minor objectives will be set forth in the specification which follows.

Figure 2:
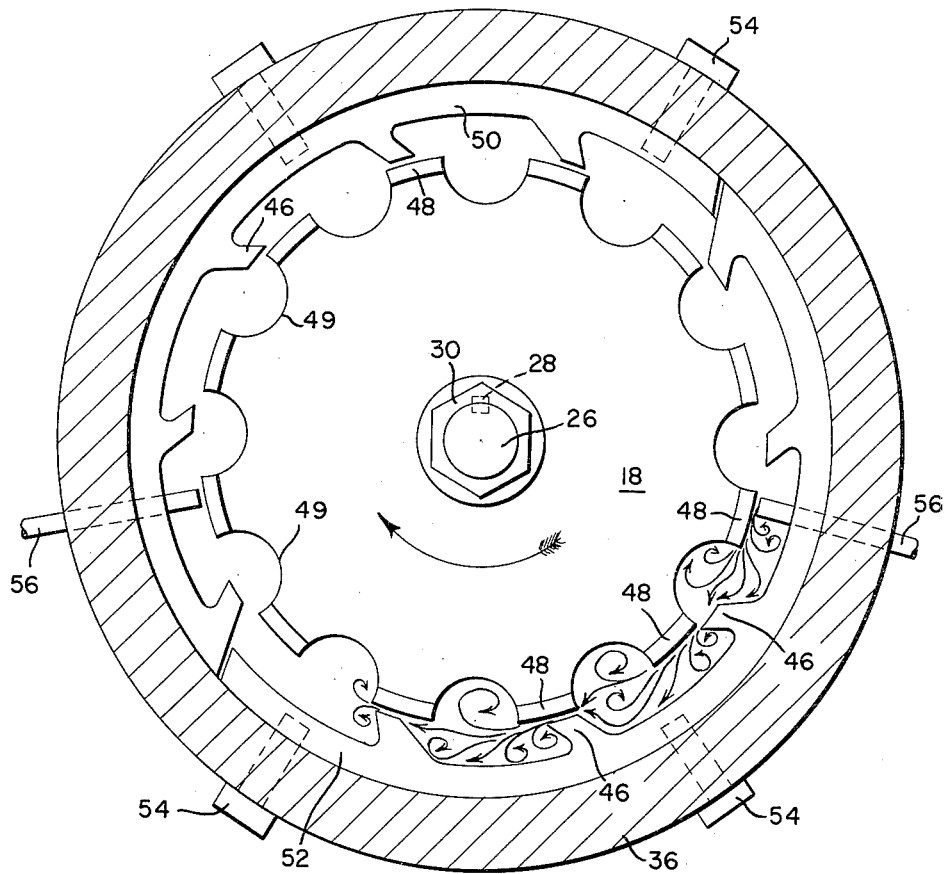
Figure 3:
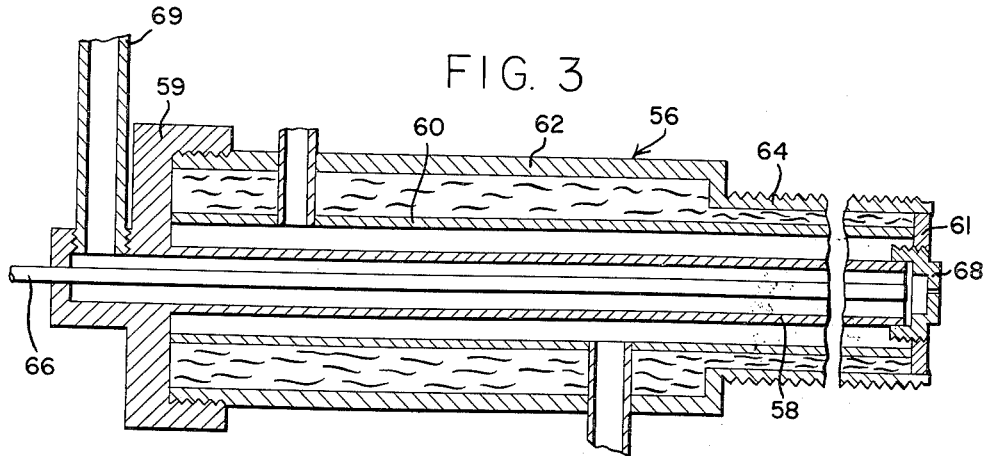

In the drawing:
FIGURE 1 is a longitudinal sectional view through the apparatus of the present invention;
FIG. 2 is a vertical sectional view taken on line II—II of FIG. 1; and
FIG. 3 is a longitudinal sectional view through one of the spinnerets shown in FIG. 2.

The apparatus embodiment chosen for illustration in FIGS. 1 and 2 includes, as the major components thereof, a vessel or casing 10 having separable sections 12 and 14, a stator 16, and a rotor 18.

Section 12 is provided with a centrally located, internally threaded fitting 20 which receives a pipe 22. The wall of section 12 is apertured to receive a bearing 24 for a driven shaft 26 which is keyed as at 28 to the rotor 18. Rotor 18 is additionally held in place on shaft 26 by a nut 30. Bearing 24 has a plurality of spaced slots 32 through which a precipitant is pumped to the interior of casing 10.

The section 14 has a flange 34 which abuts a cylindrical side wall 36 of section 12, thus presenting a cylindrical chamber 38. Sections 12 and 14 are fastened together by any suitable means. Centrally thereof, section 14 has a cavity 40 which communicates with an outlet conduit 42. Conduit 42 has a valve 44 therein for controlling the pressure within chamber 38.

Within chamber 38, the stator 16 is circumferentially disposed around rotor 18 and provided with a plurality of spaced blades or elements 46 which coact with rotor blades 48 to establish a plurality of passageways of controlled narrow clearance within chamber 38. As shown in FIGS. 1 and 2, blades 48 are radially spaced and extend laterally from the face of rotor 18 toward section 14. The outer surfaces of blades 48 are equi-distant from the axis of rotation of rotor 18 and are concentric with the tip surfaces of blades 46. Between each pair of blades 48, rotor 18 is cut away, as at 49. The optimum clearance between blades 46, 48 varies with the physico-chemical system and usually is within the range of $\frac{1}{1000}$ inch to $\frac{1}{4}$ inch.

As shown in FIG. 2, the stator 16 is made up of two inserts 50, 52 which are attached to the cylindrical side wall of chamber 38 by means of suitable fasteners 54. The stator blades 46 are angularly disposed in the direction of rotation of rotor 18. The spinnerets or nozzles 56 enter chamber 38 radially and serve as a means for injecting a solution through wall 36.

A spinneret nozzle suitable for use with the apparatus 10 of FIGS. 1 and 2 is illustrated in FIG. 3. A flow tube 58 has an integral cup-shaped closure 59 at one end. An intermediate tube 60 functions as a steam jacket the exterior of which is insulated. These elements are encased in an outer tubular element 62 which at one end is in threaded engagement with closure 59 and at its opposite end is externally threaded on a reduced portion 64. The reduced end of tubular element 62 is closed by a plate 61 which is welded thereto and into which is threaded an orificed face 68. Solution is pumped under pressure through an inlet conduit 69 which communicates with tube 58 through closure 59. Tube 58 is also provided with a thermowell 66 which extends lengthwise thereof. In assembly, reduced portion 64 is threaded into a tapped opening provided therefor in wall 36. The length of portion 64 permits adjustment of the clearance between face 68 and the rotor blades 48. Steam jacket 60 functions to prevent freezing of the spinneret, a portion of which extends into chamber 38 and is therefore submerged in the cold precipitant.

The diameter of the individual spinneret orifices depends on the physico-chemical system to be handled and may vary between 2 and 200 mills. Spinneret face 68 may be spaced from the tip surfaces of blades 48 in the range of from 1 to 250 mills.

In operation, the precipitant is pumped through pipe 22 and travels centrifugally on rotor 18 toward stator 16. Simultaneously, a polymer solution is introduced below the surface of the precipitant through one or more spinnerets 56 and starts to precipitate on contact with the precipitant. Since rotor 18 is driven at high speeds, with the blades 48 passing in close proximity to the faces of spinnerets 56 and to the tip surfaces of the stator elements 46, there is a region of extremely high shear between each of these pairs of opposed surfaces. Accordingly, high shear or slip forces are imparted to the coagulating polymeric particles which enter and pass through these regions. Because of the interaction between the blades 46, 48, there is also a zone of high turbulence or random directed shear between each pair of blades 46. The stream of polymer solution discharging from the spinnerets is in a highly deformable state. A portion of this solution is formed into highly frazzled or fibrillated fibrids in those high turbulence, random directed shear zones, particularly in those which are adjacent the spinnerets. Flow from these turbulent zones is directed toward rotor 18 by virtue of the sloping disposition of the leading surfaces of successive blades 46 and thus enters and reenters the region of high shear. Here, the remaining precipitating particles are set up as fibrids. The dwell time within chamber 38 is sufficient to insure that precipitating particles will enter and reenter several successive high shear zones between blades 46, 48 to facilitate the formation of fibrids. The apparatus 10 may therefore be termed a reentry fibridator. Flow in the high shear regions and in the random directed shear zones is indicated by the arrows shown in the vicinity of one of the spinnerets 56 in FIG. 2.

The combined pressure of the entering precipitant and polymer solution is sufficient to pressurize chamber 38 and cause a flow therethrough to the valved slurry discharge conduit 42. This pressure can be maintained, by adjustment of valve 44, at a level high enough to preclude cavitation at the rotor tips, with the result that the nozzles 56 are at all times submerged in the precipitant.

Fibrid formation is dependent on two distinct factors, namely, the physico-chemical system and the mechanical system. The magnitude of shear forces necessary to form useful fibrids is determined by the physico-chemical system (polymer, solvent, precipitant and temperature interactions). The magnitude of shear forces that can be developed depends on the particular mechanical system. The apparatus disclosed herein is capable of exerting these high shear forces upon the coagulating polymer particles. By changing certain variables in either or both of these systems, various effects on the fibrids may be produced. For example, less frazzled, relatively coarse fibrids may be obtained by increasing the clearance between the spinneret face and the rotor blades, by decreasing the speed of the rotor, by increasing the concentration of the solution or the diameter of the spinneret holes, by decreasing the temperature of the solution, by increasing the rate of solution addition, or by increasing the temperature of the precipitant. Conversely, finer, more frazzled fibrids may be obtained by varying these factors in the opposite direction.

In an actual test, a polymer solution containing 19.1 percent by weight of a copolyamide (20 parts polyhexamethylene adipamide, 80 parts polycaprolactam), 4.6 percent by weight of zinc stearate, and 76.3 percent by weight of dimethyl formamide (a total weight of 346 pounds) was fed at a rate of 3.9–4.1 pounds per minute, at 130°–140° C., through the spinnerets 56 into the apparatus 10. The precipitant, tap water at 22° C., was fed through bearing 24 at a rate giving about 9.7 gallons per minute of slurry at about 30° C. The rotor 18 was run at a speed of 5210 r.p.m. The resulting fibrid slurry, with a consistency of about 1.2–1.3% was passed to a drum filter which collected the fibrids at a rate of 1 pound per minute dry basis. These fibrids were of the highly frazzled variety, highly suited for use as a binder on paper-making machines either in combination with man-made or natural fibers or by themselves.

It is apparent that many changes and modifications may be made in the disclosed precipitation apparatus without departing from the spirit of the present invention which is accordingly intended to be limited only by the scope of the appended claims.

I claim:
1. An apparatus for treating precipitating particles, said apparatus comprising: a vessel having an enclosed chamber therein; stator means in said chamber, said stator means including a plurality of spaced elements; a rotor; means mounting the rotor for rotation in said chamber with its periphery passing in close proximity to said elements, there being inlet conduit means provided on one side of said rotor for introducing a precipitant into the chamber; a solution-injecting spinneret extending radially into said chamber between a pair of said elements and terminating adjacent the periphery of said rotor; and outlet conduit means on the opposite side of said rotor for discharging slurry from the chamber.

2. An apparatus for imparting shear forces to precipitating particles, said apparatus comprising: a vessel having an enclosed chamber therein; stator means in said chamber, said stator means including a plurality of spaced elements; a rotor having a plurality of radially spaced blades; means mounting the rotor for rotation in said chamber with the blades passing in close proximity to said elements, there being inlet conduit means provided on one side of said rotor for introducing a precipitant into the chamber; a spinneret extending into said chamber between a pair of said elements and terminating in a tip located adjacent the path of travel of said blades, there being at least one solution-injecting orifice in said tip; and outlet conduit means on the opposite side of said rotor for discharging slurry from the chamber.

3. A precipitation apparatus comprising: a vessel having a chamber therein, said chamber having a cylindrical side wall and opposed end walls; a plurality of spaced stator elements on said side wall; a rotor; means mounting the rotor for rotation in said chamber with its periphery passing in close proximity to said elements; inlet means disposed substantially centrally in one of said end walls for admitting a precipitant to the chamber, said inlet means terminating in spaced relationship to said rotor; an elongated spinneret passing radially through said side wall between a pair of said elements and terminating in a tip located adjacent the periphery of said rotor, said spinneret having at least one orifice for injecting a polymer solution into the chamber, said spinneret being tubular and in threaded engagement with said side wall whereby to permit lengthwise adjustment thereof relative to the rotor periphery; and valved outlet means in the other end wall and spaced from said side wall for discharging slurry from the chamber.

4. The apparatus of claim 3 wherein each stator element extends substantially from end to end of said chamber and has leading, tip and trailing surfaces, said leading and trailing surfaces being disposed angularly in the direction of rotation of said rotor.

5. The apparatus of claim 4 wherein said rotor is provided with a plurality of laterally extending blades, each having a tip surface complemental to the tip surfaces of said elements, there being a greater number of blades than elements, each blade being circumferentially longer than each element.

References Cited in the file of this patent

UNITED STATES PATENTS

| | | |
|---|---|---|
| 1,807,773 | Dawson | June 2, 1931 |
| 2,673,075 | Borck | Mar. 23, 1954 |
| 2,767,965 | Daman | Oct. 23, 1956 |
| 2,861,777 | Ellis | Nov. 25, 1958 |
| 2,905,448 | Martinek | Sept. 22, 1959 |